United States Patent [19]
Fuglewicz

[11] Patent Number: 5,777,239
[45] Date of Patent: Jul. 7, 1998

[54] PIEZOELECTRIC PRESSURE/FORCE TRANSDUCER

[76] Inventor: Daniel P. Fuglewicz, 106 Prospect Ave., Buffalo, N.Y. 14201-2358

[21] Appl. No.: 740,437

[22] Filed: Oct. 29, 1996

[51] Int. Cl.$^6$ ........................................ G01L 1/16
[52] U.S. Cl. ............... 73/862.68; 73/DIG. 4; 73/862.625; 73/862.636
[58] Field of Search .............. 73/862.625, 862.636, 73/862.637, 862.68, DIG. 4

[56] References Cited

U.S. PATENT DOCUMENTS

| | | | |
|---|---|---|---|
| 3,210,993 | 10/1965 | Shoor et al. | 73/862.625 |
| 3,269,175 | 8/1966 | Sprosty | 73/862.68 |
| 3,269,474 | 8/1966 | Ostrow | 73/862.68 X |
| 4,168,518 | 9/1979 | Lee | 73/862.636 X |
| 4,320,667 | 3/1982 | Forrester et al. | 73/862.636 X |
| 4,802,371 | 2/1989 | Calderara et al. | 73/DIG. 4 |
| 5,142,914 | 9/1992 | Kusakabe et al. | 73/DIG. 4 X |
| 5,265,481 | 11/1993 | Sonderegger et al. | 73/862.625 |
| 5,365,799 | 11/1994 | Okada | 73/862.68 X |
| 5,578,766 | 11/1996 | Kondo | 73/862.68 |

Primary Examiner—Elizabeth L. Dougherty
Attorney, Agent, or Firm—Harrison & Egbert

[57] ABSTRACT

A pressure/force transducer having a sensor body with a load-receiving member at one end, a load button positioned within the sensor body and having a curved surface in surface-to-surface continuous contact with the load-receiving member, a piezoelectric plate positioned within the sensor body and in contact with the load button, and a signal processor for converting the electrical charge produced by the piezoelectric plate into a humanly perceivable signal. A preloading member is connected to the sensor body so as to adjustably force the load button into surface-to-surface contact with the load-receiving member. The load-receiving member is integrally formed with the sensor body. This load-receiving member has a radiused corner connecting the member to the sensor body. The load button is a generally cylindrical member with a generally curved surface in contact with the load-receiving member.

16 Claims, 2 Drawing Sheets

PIEZOELECTRIC PRESSURE/FORCE TRANSDUCER

TECHNICAL FIELD

The present invention relates to transducers that measure force or pressure. More particularly, the present invention relates to pressure transducers that use piezoelectrics for producing a charge relative to the applied pressure. Furthermore, the present invention relates to pressure transducers that measure combustion pressure.

BACKGROUND ART

The measurement of pressure is carried out by a wide variety of instruments in a wide variety of environments. In many circumstances, pressure transducers are used for the measurement of pressures in internal combustion engines. With the market pressure to deliver automobiles with engines that deliver more and more horsepower and still have to meet ever more stringent emission regulations, the need to monitor combustion pressure for all cylinders on the vehicle is becoming inevitable.

High demands are made on engines for vehicles as well as stationary diesel engines regarding low fuel consumption, reliable operation, low air pollution and vibration-free running. The required precision of transducers for research and development of combustion engines has increased accordingly. These transducers have to cope with unsteady and very high thermal stressing during the process of combustion and with the high number of mechanical load cycles. Therefore, considerable demands are made on the stability and insensitivity to temperature changes and on the ability to withstand the harsh environment (aggressive chemical environment) of such instruments.

The most efficient way of acquiring knowledge of the combustive/reactive process inside an internal combustion engine is to measure and record the pressure curve in the combustion chamber. Piezoelectric transducers have been used for many years to measure pressure inside the cylinder. New digital signal processing systems, however, allow the analysis of pressure curves with very high precision, and the quality and reliability of the transducers has therefore become of paramount importance.

Piezoelectric instruments were first utilized in the development of internal combustion engines for measuring pressures in the combustion chamber. Today, they are also used for dynamic force and acceleration measurements. Of the numerous piezoelectric materials available today, quartz is employed preferentially for transducers because of its durability and long-term stability properties for measuring applications. The piezoelectric transducer is an active transducer. It consists essentially of thin slabs or plates cut out in a suitable position relative to the crystal axis. The finely lapped plates are assembled into a stack and usually preloaded with a spring sleeve. This quartz column gives a charge signal which is directly proportional to the force sustained. The position of the quartz crystal axes in relation to the force sustained results in longitudinal effect, or transverse effect, or shear effect. With the longitudinal effect, the negative lattice points in the crystal lattice are displaced toward the positive ones by the force imposed so that the equilibrium of the charges is disturbed and measurable charge differences result on the surfaces of the crystal plates. Characteristic of the longitudinal effect is the tapping of the charge on the force application surfaces. With the longitudinal effect, the magnitude of resulting charge depends not on the geometric dimensions of the quartz plates but solely upon the applied force.

In previous conventional designs of piezoelectric pressure transducers, the sensor diaphragm was a flat surface onto which the sensor's internals were held against. As the pressure changed, the force on the diaphragm changed, thereby changing the force seen inside the sensor. While this design worked very well (as is still commercially available), this design has a major design flaw when used in environments that encounter large thermal gradients (e.g. internal combustion engines). When the sensor is subjected to a large thermal gradient, the outside face of the sensor's diaphragm starts to expand due to the thermal expansion. The inside face of the diaphragm is relatively much cooler than the outside face and therefore does not expand as much. The result is that the diaphragm "buckles" away from the sensor toward the higher temperature. When the diaphragm buckles, the amount of force that is transferred to the internal parts of the sensor is greatly reduced because of the loss of contact and/or preloading between the diaphragm and the sensor internals. Even the slightest amount of buckling greatly affects the pressure reading because the internal sensor structure is very stiff and cannot "follow" the diaphragm as it expands. Another drawback of previous designs is the use of a separate relatively very thin piece that functions as the diaphragm. This piece is welded onto the sensor body. After many thermal cycles, the weldment breaks down and eventually causes sensor failure. Harsh environments attack the diaphragm. Thin diaphragms can abrade or corrode. This can cause mechanical failure. Even if an internal diaphragm/body design is used, the sharp corner edge of the design becomes a "stress riser". This is an area of the sensor where mechanical stress becomes concentrated and therefore limits the useful life of the sensor.

In the past, various patents have issued relating to piezoelectric pressure transducers.

U.S. Pat. No. 2,068,744, issued on Jan. 26, 1937 to W. Gutezke, describes a piezoelectric pressure measuring device. This device is in the form of a normal spark plug and includes a hollow metallic body with a shoulder and a hollow metallic member threaded into the first body. A metallic diaphragm is fitted on the shoulder of the first body and pressed firmly on the shoulder by the threaded member. A metallic tubular member has a lower end which is firmly connected to the diaphragm. The upper end of the metallic tubular member has a bearing surface and contains an insulated ignition pin. The diaphragm hermetically seals off a hollow space against the combustion chamber of the cylinder. This hollow space contains piezoelectric crystals constructed in the form of rings concentrically surrounding the ignition pin and pressed between a pressed ring placed over the bearing surface and a threaded cover. This patented device does not have an integral piece between the pressure area and the piezoelectric crystals. As such, there exists the possibility of leakage at the interface of the parts. The diaphragm has a substantial area open to air within the sensor. Also, there is no insulation of the piezoelectric crystals at the inner diameter of the rings. Fundamentally, this device does not seal the sensor from the combustion gases. As such, over time, the sensor will become unreliable.

U.S. Pat. No. 4,441,044, issued on Apr. 3, 1984 to Ruckenbauer et al. describes a transducer with a piezoelectric sensor element. This describes a pressure transducer which not only has a dynamic pressure transducer measurement capability, but also has the capability of measuring other static variables, such as static pressure. This transducer uses two piezoelectric sensor elements which are formed of two disc-shaped platelets of a piezoelectric material. The sensor elements are contacted by a suitable contact electrode so as to utilize the piezoelectric longitudinal effect. Dynamic pressure changes, such as those resulting in dynamic changes of the forces acting upon the membrane, are measured by utilizing the direct piezo-effect. This device is very similar to conventional compression-mode piezoelectric transducers which have been available for many years. This device utilizes a separate diaphragm attached to the bottom of the sensor. This device does not provide an adequate method of preloading the sensor. Because of the use of flat parts, such as the thin diaphragm and the prestressing sleeve, when a thermal gradient strikes the sensor, the diaphragm will pull away from the prestressing sleeve so as to greatly affect the measurement.

U.S. Pat. No. 4,483,179, issued on Nov. 20, 1984 to Oshima et al., describes a method and device for detecting knocking in an internal combustion engine. In one embodiment of this invention, a compression-mode piezoelectric transducer is used for pressure measurement. As is shown in FIG. 4 of this patent, a pressure gage is connected to a water jacket which has a pressure-transmitting member which makes contact with the back face of a pressure plate at the tip of the housing and two piezoelectric elements, having an electrode between them, which are positioned between the pressure transmitting member and the base plate supported in the housing. When the knocking takes place in the combustion chamber, the pressure of the cooling water in the water jacket is made to fluctuate by the knocking through the cylinder. The pressure fluctuation is received by the pressure plate of the pressure gage. The piezoelectric elements are depressed through the pressure transmitting member. An output charge of the piezoelectric element is transmitted as an output from the electrode to the terminal. Unfortunately, this device cannot directly measure combustion chamber pressures. Although a spherical-shaped piece is described, it is not preloaded to the point where the maximum possible area of the pressure plate is in intimate surface-to-surface contact with the pressure transmitting member. The pressure plate (i.e. diaphragm) will still deform under temperature gradients. The square inside and outside corners of the pressure plate create "stress risers" when the pressure plate is stressed. The use of an annular flexure section in the pressure plate would indicate that this plate is designed to be allowed to move.

U.S. Pat. No. 4,620,438, issued on Nov. 4, 1986 to W. Y. Howng, describes a cylinder pressure transmitter for an internal combustion engine. This pressure transmitter includes a means for mounting piezoelectrics in sealed relation to an engine cylinder so as to be responsive to variations in cylinder pressure during engine operation. This serves to provide initial electric signals representative of pressure variations in the cylinder. This device has no internal diaphragm and no spherical (domed) preloading piece. The flat diaphragm arrangement of this patent, with the corresponding flat preloading surface of the piezoelectrics directly under the diaphragm, ensures that thermal gradients produced during combustion will allow the diaphragm to pull away from the piezoelectrics. This unloading of the piezoelectrics causes a large error in the pressure signal. In addition, with the piezoelectrics being so close to the diaphragm, the piezoelectrics will be directly affected by the thermal gradient because the piezoelectric material is also pyroelectric.

It is an object of the present invention to provide a piezoelectric pressure/force transducer.

It is another object of the present invention to provide a piezoelectric pressure transducer which includes no welding at the area of interface with the pressure source.

It is another object of the present invention to provide a piezoelectric pressure transducer that avoids stress riser problems.

It is a further object of the present invention to provide a piezoelectric pressure transducer which avoids undesirable thermal gradient effects.

It is a further object of the present invention to provide a piezoelectric pressure transducer that can withstand harsh chemical environments by using a relatively thick diaphragm.

It is still a further object of the present invention to provide a piezoelectric pressure transducer which is relatively inexpensive and very accurate.

It is still a further object of the present invention to provide a piezoelectric pressure transducer which is easy to manufacture and easy to use.

These and other objects and advantages of the present invention will become apparent from a reading of the attached specification and appended claims.

SUMMARY OF THE INVENTION

The present invention is a pressure/force transducer that comprises a sensor body having a load-receiving member at one end, a load button positioned within the sensor body and having a curved surface in surface-to-surface continuous contact with the load-receiving member, piezoelectric plates positioned within the sensor body and in contact with the load button and an output means electrically connected to the piezoelectric plates so as to conduct the electrical charge from the piezoelectric plates to a connector of which the appropriate signal conditioner is attached. A preloading device is connected to the sensor body so as to adjustably force the load button into surface-to-surface contact with the load-receiving member.

In the present invention, the preloading device is a threaded member that extends into the sensor body from an end of the sensor body opposite the load-receiving member. The threaded member has an end in surface-to-surface contact with a piezoelectric plate. The sensor body has an internally threaded section therein. The threaded member is threadedly received by this threaded section. The threaded member has a surface formed thereon which extends outwardly of the sensor body.

In the present invention, the output means includes a conductive line which is electrically connected to the piezoelectric plates and extends through an interior of the threaded member. Suitable signal processing electronics are connected to this conductive line via a suitable connector so as to create the humanly perceivable signal proportional to the pressure which is measured by the piezoelectric plates. A retaining sleeve extends around an exterior surface of the load button, the piezoelectric plates and a portion of the preloading device. This retaining sleeve is positioned within the interior of the sensor body.

The load-receiving member is integrally formed with the sensor body. In particular, this load-receiving member has a radiused corner which connects the pressure-bearing surface to the sensor body. The load button is a generally cylindrical member with a curved surface in contact with the load-receiving member. The load button has a flat bottom surface in surface-to-surface contact with one of the piezoelectric plates.

In the present invention, the piezoelectric plates include a first plate being in surface-to-surface contact with the load button, a second plate having a surface in contact with the preloading device, and an electrode interposed between the first and second plates. The electrode is in electrical connection with the output means. Each of the first and second plates is of an annular configuration. An insulating material is positioned within the inner diameter of the annular configuration of the first and second plates.

DETAILED DESCRIPTION OF THE INVENTION

Figure 1:
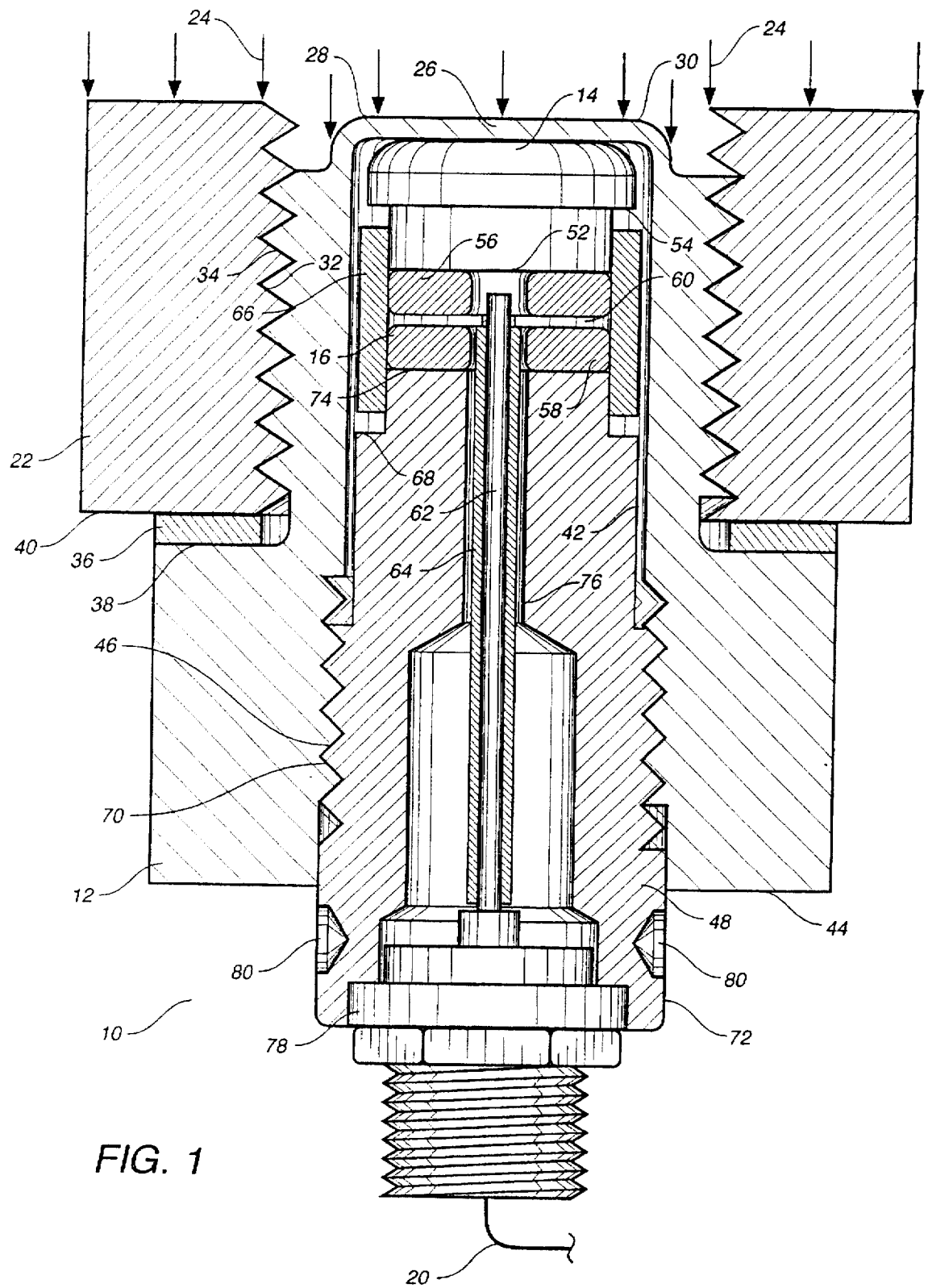
FIG. 1 is a cross-sectional view of the piezoelectric pressure sensor in accordance with the preferred embodiment of the present invention shown mounted in a measuring situation.

Referring to FIG. 1, there is shown at 10 a cross-section of the piezoelectric pressure transducer in accordance with the teachings of the present invention. The piezoelectric pressure transducer 10 includes a sensor body 12, a load button 14, piezoelectric plates 16, and an output and processing connection 20. In particular, in FIG. 1, it can be seen that the sensor body 12 is mounted into a pressure vessel 22. In accordance with the preferred use of the present invention, the pressure vessel 22 can be an internal combustion engine. Force lines 24 are illustrated showing how force or pressure will act on the load-receiving member 26 of the sensor body 12.

The sensor body 12 has its load-receiving member 26 formed at the top of the sensor body 12. The load-receiving member 26 is designed for the high temperature high pressure application within the interior of the pressure vessel 22. The load-receiving member is integrally formed with the sensor body 12 so as to avoid any undesirable welding. The corners 28 and 30 of the load-receiving member 26 are radiused so as to avoid stress risers. The action and benefits of such radiused corners will be described hereinafter in conjunction with FIGS. 3A and 3B.

The sensor body 12 includes external threads 32 which are designed so as to be received by the internal threads 34 of the pressure vessel 22. As such, the sensor body 12 can be easily threadedly received into its desired position within the pressure vessel 22. Once the threads 32 of the sensor body 12 are installed within the threads 34 of the pressure vessel 22, the load-receiving surface 26 will be in a proper position for the receipt of pressures and/or forces from the interior of the pressure vessel 22. A suitable sealing washer 36 is interposed between the shoulder 38 of the sensor body 12 and the outer surface 40 of the pressure vessel 22. The sealing washer 36 can be a high-temperature elastomeric or washer O-ring that ensures that there is a proper seal between the sensor body 12 and the pressure vessel 22 so that no pressure from the interior of the pressure vessel 22 can escape.

The sensor body 12 has an interior passageway 42 extending from end 44 to the load-receiving member 26. An internal thread 46 is formed adjacent to the end 44 of the sensor body 12. The internal thread 46 in the interior passage 42 serves to receive the preloading device 48.

Load button 14 is positioned within the interior passage 42 of the sensor body 12. The load button 14 has a curved surface 50 in surface-to-surface contact with the interior surface of the load-receiving member 26. The load button 14 has a generally cylindrical configuration with the curved surface 50 being of a generally semi-spherical form. The load button 14 has a flat bottom surface 52 which is in surface-to-surface contact with the piezoelectric plates 16. The load button 14 also has shoulder 54 formed on its exterior. The load button 14 is configured so as to transfer forces acting on the load-receiving member 26 to the piezoelectric plates 52. The preloading device 48 serves to assure that the top surface 50 of the load button 14 is in continuous surface-to-surface contact with the load-receiving member 26.

The piezoelectric plates 16 includes a first annular plate 56 and a second annular plate 58. The first plate 56 has a surface in contact with the flat surface 52 of the load button 14. The second plate 58 has a surface in contact with the preloading device 48. An electrode 60 is interposed between the first plate 56 and the second plate 58. The electrode 60 is in electrical connection with the output connector 20. In particular, a conductive line 62 will extend through the interior of the preloading device 48 so as to be in connection with the output connector 20. A suitable insulator 64 is formed around the conductive line 62 so as to insulate the interior of the piezoelectric plates 56 and 58 and the preloading device 48.

The piezoelectric plates 56 and 58 serve to convert a pressure/force load transferred by the load button 14 into an electrical charge. The plates 56 and 58 are installed so that the cathode (−) side of the plates both face the electrode 60.

The retaining sleeve 66 is an annular member which extends around an exterior surface of the load button 14, around the exterior of the piezoelectric plates 56 and 58, and around a portion of the preloading device 48. This retaining sleeve 66 is installed within the interior passageway 42 of the sensor body 12. The retaining sleeve 66 holds the load button 14, the plates 56 and 58 and the electrode 60 in place. The shoulder 54 of the load button 14 and the shoulder 68 of the preloading device 48 serve to retain the sleeve 66 in its proper position. Retaining sleeve 66 is made of an appropriate insulating material.

The preloading device 48 is a screw which has external threads 70 that are threadedly received by the threaded section 46 on the interior of the sensor body 12. A circular section 72 with two small depressions 80 is formed on the preloading device 48 so as to allow a suitable wrench to be applied to the preloading device 48 for the purpose of tightening the device. Suitable rotations on the circular surface 72 causes the preloading device 48 to be drawn into the interior passageway 42 of the sensor body 12. A surface 74 at the interior end of the preloading device 48 will serve to exert a preloading force on the piezoelectric plates 56 and 58 and also upon the load button 14. This allows the piezoelectric plates 56 and 58 to be preloaded well into the linear response region. It also serves to force the load button 14 firmly against and in surface-to-surface contact with the load-receiving member 26. The preloading device 48 includes an interior passageway 76 which allows the conductive line 62 to pass therethrough.

A sensor connector 78 acts as the user connection. The charge from the piezoelectric plates 56 and 58 is transferred via electrode 60 through the charge conductor 62 to the sensor connector 78. The user can read the amount of charge due to the pressure/force acting on the top of the sensor body 12. Suitable instruments and signal processing equipment, including amplifiers and instruments, can be connected to the output line 20.

Figure 2:
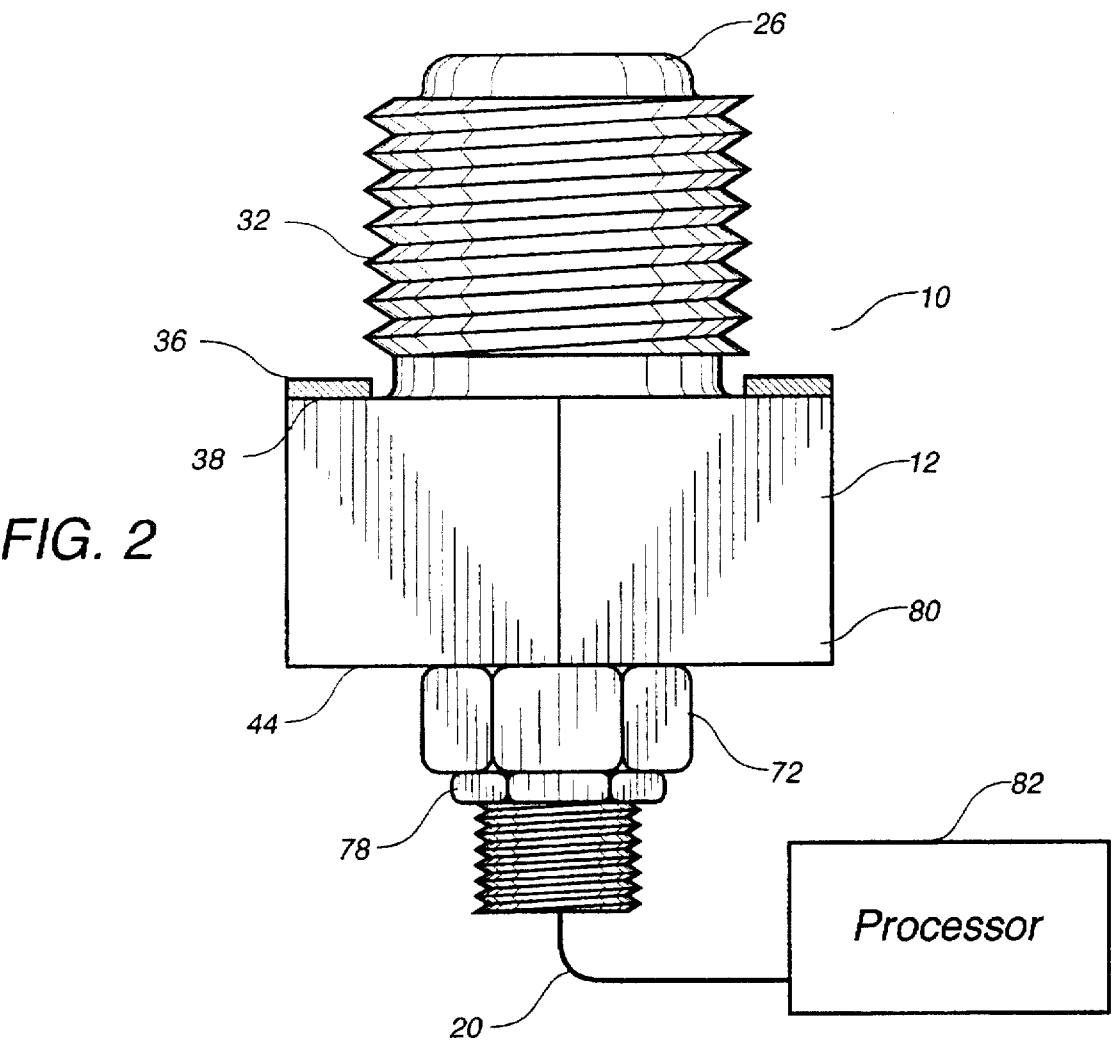
FIG. 2 is a side elevational view of the piezoelectric pressure transducer of the present invention.

FIG. 2 is an exterior view of the piezoelectric pressure sensor 10. In particular, it can be seen that the domed top surface 26 is in a suitable position for entry into a pressure vessel. Threaded section 32 allows the transducer 10 to be suitably inserted into a threaded port of the pressure vessel. Sealing washer 36 is positioned on the exterior surface 38 of the sensor body 12. Sensor body 12 includes a hexagonal surface 80 which allows a suitable wrench, or other device, to be used so as to tighten and to install the transducer 10 into a threaded port. It can be seen that the circular surface 72 of the preloading device 48 extends outwardly from the bottom 44 of the sensor body 12. Output connector 20 is shown as extending outwardly of the sensor connector 78 for attachment to a suitable signal processor 82. Processor 82 is standard instrumentation for the measurement of pressures affecting the domed surface 26 on the pressure transducer 10.

Figure 3A:
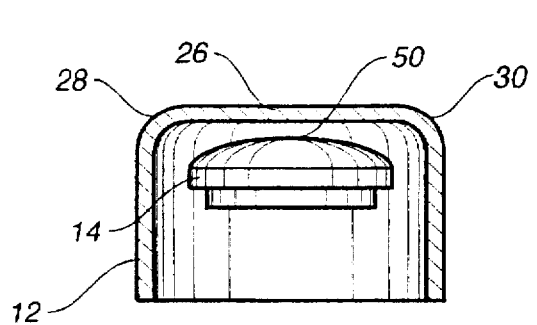
FIGS. 3A and 3B show the arrangement for the "preloading" of the load-receiving surface of the present invention.
Figure 3B:
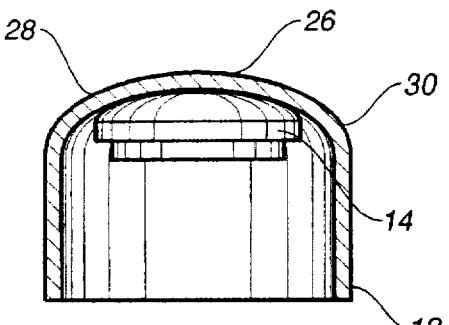

FIGS. 3A and 3B illustrate how the generally semi-spherical top surface 50 of the load button 14 suitably contacts the deformable load-receiving member 26 on the sensor body 12. In FIGS. 3A and 3B, it can be seen that the load-receiving surface 26 has radiused edges 28 and 30 which connect the load-receiving member 26 to the sensor body 12. If the transducer 10 is assembled and preloaded, the curved face 50 is pressed against the normally flat load-receiving member 26. Enough preloading is made so that the load-receiving member 26 is in continuous surface-to-surface contact with the load button 14. The contour of the surface 50 of the load button is such that the member 26 will naturally follow the shape of the load button 14 as the preload is applied. In FIGS. 3A (before preload) and 3B (after preload), the amount of curvature is shown in an exaggerated fashion for visualization.

By forcing the deformable load-receiving member 26 to conform to the load button 14 places a large amount of "stress-stiffening" on the member 26 so that, when subjected to a thermal gradient, the member 26 is held in place. As a result, the thermal gradient will not affect the transducer's pressure reading. Since the outside edge of the member 26 has a radius, the "stress-riser" problem is eliminated. Since the load button 14 is interior of the sensor body 12, there is no need for welding of the member 26. As such, the problems associated with welds are avoided.

The herein described transducer is an effective dynamic force/pressure transducer. The term "dynamic" refers to the fact that the sensor measures a varying force/pressure very well and can read static (stable, level) forces/pressures for only a limited period of time. This time is limited by the signal conditioning that lies in the measuring chain after the sensor, not due to the sensor design itself. The term "force/pressure" is used because the sensor is capable of measuring both force and pressure. The sensor is mounted in a plate to measure a force or in a pressure vessel to measure pressure.

The present invention is capable of measuring dynamic pressures of any type. However, as used herein in the preferred embodiment of the present invention, it is specifically designed to withstand and measure large pressure variations in harsh environmental conditions, such as those found on the interior of the internal combustion engine. The present invention provides a transducer with a longer life due to a more rugged interface between the sensor and the media under pressure. There is less temperature sensitivity due to a highly stiffen ed "preloaded" configuration. The simple mounting arrangement of the present invention allows the present invention to be installed in the same manner as a spark plug. The design of the present invention does not require external or ancillary hardware for installation or operation. As a result, the simplicity of the present invention can be relatively inexpensive.

Prior art piezoelectric transducers relied upon an external preloading force, by using a press or a vice, to preload the transducer to ensure integral contact between all of the pieces of the sensor. During this preload, the final weld of the sensor is made and the external preload is then released. Although some amount of preload is maintained, some is lost. In addition, the practical amount of preload that can be applied in this manner is limited due to the limited strength of the weld and the small amount of deflection that can be applied before excessive stress to the sensor parts occurs. In contrast, in the present invention, an integral preloading device is used which mates with the sensor body so as to apply the preloading force to all of the sensor parts. This integral preloading device allows a much greater preloading force to be applied to the sensor pieces and thereby ensures better integral contact between the pieces. It also provides for the deflection of the top of the sensor body so as to conform to the domed load button. If necessary, in order to lock the preloading force and to seal the sensor, a weld or high-strength, high-temperature adhesive can be applied between the preloading device and the bottom of the sensor body.

Unlike previous designs which use a flexible diaphragm to transfer the load to the sensing section of the sensor, or to designs that rely on a diaphragm deflection in order to sense the applied pressure, the present invention uses a relatively thick and non-deflecting pressure/force bearing area. In the present invention, the preloading screw forces the domed load button up into the top of the sensor body. The load button's displacement continues until the entire top of the load button is engaged to the sensor body. At that point, all sensor pieces are in integral contact and any deflection due to a pressure/force is due to the actual compression of the sensor's parts. This results in an advantage in that there is no "flexible diaphragm" which deflects. As a result, there can be no fatigue over a long period of load cycling. Furthermore, and advantageously, the section of the sensor body that is subjected to the pressure/force environment can be substantially thicker so that during the life of the sensor, this section of the sensor body will not deteriorate as much as thin-sectioned designs because of the effects of harsh temperature and chemical or physical conditions.

The present invention utilizes a one piece part that contains the pressure/force bearing area, the mounting threads, and the tightening sections. This allows a simple design with a low number of parts. There are no welds in the area where the sensor will encounter pressure. The sensor body in that section is formed from one integral piece that allows the sensor to withstand harsh environments over a longer period of time than previous designs.

The foregoing disclosure and description of the invention is illustrative and explanatory thereof. Various changes in the details of the illustrated configuration may be made within the scope of the appended claims without departing from the true spirit of the invention. The present invention should only be limited by the following claims and their legal equivalents.

I claim:

1. A pressure/force transducer comprising:
   a sensor body having a load-receiving member at one end;
   a load button positioned within said sensor body, said load button having a curved surface extending across an end of said load button, a substantial majority of an area of said curved surface being in surface-to-surface continuous contact with said load-receiving member;

piezoelectric plate means positioned within said sensor body and in contact with said load button, said piezoelectric plate means for converting a load applied to said load-receiving member into an electrical charge;

output means electrically connected to said piezoelectric plate means for converting said electrical charge into a humanly perceivable signal; and preloading means connected to said sensor body, said preloading means for adjustably forcing said load button into surface-to-surface contact with said load-receiving member, said preloading means comprising:

a threaded member extending into said sensor body from an end of said sensor body opposite said load-receiving member, said threaded member having an end in surface-to-surface contact with said piezoelectric plate means.

2. The transducer of claim 1, said sensor body having an internally threaded section therein, said threaded member threadedly received by said threaded section.

3. The transducer of claim 2, said threaded member having a circular surface formed thereon and extending outwardly of said sensor body.

4. The transducer of claim 1, said output means comprising:

a conductive line electrically connected to said piezoelectric plate means and extending through an interior of said threaded member.

5. The transducer of claim 1, further comprising:

a retaining sleeve extending around an exterior surface of said load button and said piezoelectric plate means and said preloading means, said retaining sleeve positioned interior of said sensor body.

6. The transducer of claim 1, said load-receiving member being integrally formed with said sensor body.

7. A pressure/force transducer comprising:

a sensor body having a load-receiving member at one end;

a load button positioned within said sensor body, said load button having a curved surface extending across an end of said load button, a substantial majority of an area of said curved surface being in surface-to-surface continuous contact with said load-receiving member, said load-receiving member being integrally formed with said sensor body, said load-receiving member having a radiused corner connecting said load-receiving member with said sensor body, piezoelectric plate means positioned within said sensor body and in contact with said load button, said piezoelectric plate means for converting a load applied to said load-receiving member into an electrical charge; and output means electrically connected to said piezoelectric plate means for converting said electrical charge into a humanly perceivable signal.

8. The transducer of claim 1, said load button being a generally cylindrical member with a generally curved surface in contact with said load-receiving member.

9. The transducer of claim 8, said load button having a flat bottom surface in surface-to-surface contact with said piezoelectric plate means.

10. The transducer of claim 1, said piezoelectric plate means comprising:

a first plate having a surface in contact with said load button;

a second plate having a surface in contact with said preloading means; and an electrode interposed between said first and second plates, said electrode being in electrical connection with said output means.

11. The transducer of claim 10, each of said first and second plates being annular members with an inner diameter, said piezoelectric plate means further comprising:

an insulating material positioned in said inner diameter of said first and second plates.

12. A pressure/force transducer comprising:

a sensor body having a load-receiving member, said load-receiving member being integrally formed with said sensor body at one end;

a load button positioned interior said sensor body, said load button having a surface in direct surface-to-surface contact with said load-receiving member, said load-receiving member having a radiused corner connecting said load-receiving member with said sensor body;

piezoelectric plate means positioned within said sensor body and in contact with said load button, said piezoelectric plate means for converting a load applied to said load-receiving membering into an electrical charge; and output means electrically connected to said piezoelectric plate means for converting said electrical charge into a humanly perceivable signal.

13. The transducer of claim 12, said load button having a curved surface, said curved surface being in continuous contact with said load-receiving member over a substantial majority of a total surface area of said curved surface.

14. The transducer of claim 12, further comprising:

preloading means connected to said sensor body, said preloading means for adjustably forcing said load button into surface-to-surface contact with said load-receiving membrane.

15. A pressure/force transducer comprising:

a sensor body having a load-receiving member at one end;

a load button positioned within said sensor body, said load button having a curved surface in direct contact with said load-receiving member;

a preloading means connected to said sensor body, said preloading means for adjustably forcing said load button into surface-to-surface contact with said load-receiving member such that a substantial majority of a total area of said curved surface resides in surface-to-surface contact with said load-receiving member, said load-receiving member being integrally formed with said sensor body, said load-receiving member being a deformable membrane having a radiused corner connecting said membrane with said sensor body, said curved surface of said load button being in continuous surface-to-surface contact with said load-receiving member;

piezoelectric plate means positioned within said sensor body and in contact with said load button, said piezoelectric plate means for converting a load applied to said load-receiving member into an electrical charge; and output means electrically connected to said piezoelectric plate means for converting said electrical charge into a humanly perceivable signal.

16. The transducer of claim 15, said preloading means comprising:

a threaded member extending into said sensor body from an end of said sensor body opposite said load-receiving member, said threaded member having an end in surface-to-surface contact with said piezoelectric plate means.

* * * * *